Dec. 28, 1965 J. EARLE 3,226,565
LOGIC TREE COMPRISING NOR OR NAND LOGIC BLOCKS
Filed March 28, 1961

INVENTOR
JOHN EARLE
BY Carl C. Kling
ATTORNEY 3,226,565

LOGIC TREE COMPRISING NOR OR NAND LOGIC BLOCKS

John Earle, Wappingers Falls, N.Y., assignor to International Business Machines Corporation, New York, N.Y., a corporation of New York Filed Mar. 28, 1961, Ser. No. 98,909
3 Claims. (Cl. 307—88.5)

This invention relates to logical circuits, and more particularly to a logical circuit, made up of stroke-type blocks, which is the functional equivalent of the relay tree.

The stroke-type block includes the Sheffer stroke function (AND inverter) as well as its dual, the Pierce function (OR inverter). These circuits might also be characterized as NAND and NOR blocks.

The logical tree is a complete decoder generally in minimal form for relays and certain other circuit elements. Logical design techniques built around the tree have become well known and are discussed in such texts as Caldwell, Switching Circuits and Logical Design, Wiley and Sons, 1958. The essence of logical design utilizing the tree is the reduction of the desired switching function to a standard statement such as sum of products and the deletion of those elements of the tree which are unnecessary to the production of those terms. The relay tree has several levels, with the number of switching elements in any given level being twice the number of switching elements in the previous level, so that the triangle of "tree" configuration is achieved. The output of each switching element in the final level, or lower branch level of the tree, is a complete term in the standard sum of products. For example, in a three-variable tree, where the variables are designated A, B and C, the final level output of the array of switching circuits is, for each such switching circuit, one term of the standard sum of products;

$$ABC+AB\bar{C}+A\bar{B}C+A\bar{B}\bar{C}+\bar{A}BC+\bar{A}B\bar{C}+\bar{A}\bar{B}C+\bar{A}\bar{B}\bar{C}$$

This sum or products statement depends upon the rules of notation of Boolean algebra:

(1) Variables are designated A, B and C, etc.

(2) The complement of A is "not A," written $\bar{A}$; the complement of B is "not B," written $\bar{B}$; etc.

(3) The logical AND (product or coincidence) of two variables, such as A and B, is indicated by proximity, the "multiply dot," or the "quantity multiply parentheses." These statements are all "A and B:"

$$AB \quad A\cdot B \quad (A)(B)$$

Complex statements follow the same pattern.

$$(ABC)(M\cdot N)$$

is read "The quantity A and B and C and the quantity and N."

(4) The logical OR (sum) of variables such as A, and such as B, is indicated by a + sign.

(5) An entire term such as $AB\bar{C}$ can be complemented, as shown by a term-size bar $\overline{AB\bar{C}}$. A multi-term expression can be complemented. Complements of entire expressions foll certain rules, often referred to as De Morgan's theorem. The complement of a sum of products is a product of sums; the product of sums for the relay tree is as follows:

$$(\bar{A}+\bar{B}+\bar{C})(\bar{A}+\bar{B}+C)(\bar{A}+B+\bar{C})(\bar{A}+B+C)$$
$$(A+\bar{B}+\bar{C})(A+\bar{B}+C)(A+B+\bar{C})(A+B+C)$$

De Morgan's theorem for complementing a Boolean expression is as follows:

$$\overline{ABC}=\bar{A}+\bar{B}+\bar{C}$$
$$\overline{\bar{A}\bar{B}\bar{C}}=A+B+C$$
$$\overline{ABC}+\overline{\bar{A}\bar{B}C}=(\bar{A}+\bar{B}+\bar{C})(A+B+\bar{C})$$
$$=\bar{C}+(\bar{A}+\bar{B})(A+B)$$

To complement a Boolean expression, change each logical "and" sign to "or" and each "or" sign to "and," and complement each variable.

For more complete analysis of Boolean algebra see Caldwell, Switching Circuits and Logical Design, Wiley and Sons, 1958, and Richards, Arithmetic Operations in Digital Computers, Van Nostrand, 1955.

It has become common practice to develop logical expressions and then to conform a relay tree to the logic by lopping off unnecessary branches. Techniques of deleting switching elements which form branches unnecessary to the desired logical terms are defined and discussed in detail by Caldwell.

The logical power of the stroke-type block has recently become very well known. "Stroke-type block" is a generic term for the family of AND inverters and OR inverters. The duality of the AND inverter and the OR inverter has been pointed up in such publications as Kellett, "The Elliot-Sheffer Stroke Static Switching System," Electronic Engineering, September 1960, pages 534–539. For simplicity and ease in understanding, the invention is illustrated and described in terms of, but not limited to, the AND-inverter stroke-type block. In the AND inverter stroke-type block, inputs A, B and C produce output product term $\overline{ABC}$, which is the same as output sum term $\bar{A}+\bar{B}+\bar{C}$. The utilization of this power has generally been in special-purpose logical circuits. Because of the inversion inherent in each stroke-type block, it has not been thought practical to use the stroke-type block in a tree configuration because the AND circuit cannot generally feed other identical AND circuits. Accordingly, logical designers have generally bypassed the tree configuration when using stroke-type blocks. It is the object of this invention to provide a logical equivalent of a tree circuit made up entirely of stroke-type blocks.

A feature of the invention is the presentation of a group of stroke-type blocks according to the following algorithm, where $n$ is the number of input variables and $x$ is any particular bank of stroke-type block, banks 0 to $n$:

(a) Each bank $x$ (except bank $n$) receives as inputs to respective stroke-type blocks specific sets of all possible sets of combinations of $(n-x)$ input variables;

(b) Each stroke-type block which receives a set of inputs specified above in clause (a) also receives as inputs the outputs from all previous bank stroke-type blocks which have input sets including the same input variables;

(c) Bank $n$ stroke-type block receives as inputs the outputs from each stroke-type block in each previous bank of stroke-type blocks;

(d) The number $C_x^n$ of stroke-type blocks in any given bank $x$ for an $n$-input tree is a factorial function of $n$ and $x$ as follows:

$$C_x^n=\frac{n!}{(n-x)!x!}$$

(e) And the total number (sum) of stroke-type blocks in a complete tree is as follows:

$$\operatorname*{Sum}_{x=0}^{x=n}\left(\frac{n!}{(n-x)!x!}\right)=2^n$$

An advantage of the invention is the utilization of a single standard circuit block, the stroke-type block (AND inverter or OR inverter) from which the entire logical tree is built.

Another advantage of the invention is the advantage to be expected from a tree circuit—those circuit elements which generate terms of the standard sum of products which are unnecessary to the desired logic can be eliminated.

Another object is minimization of tree-type circuits.

An advantage of the invention is the possibility of eliminating stroke-type circuits, particularly those used as inverters, by "bundling" of several connecting wires as logical inputs to a receiving stroke block. Connecting wires in prior art normally apply signals to a logical AND stroke-type block, producing the complement of a signal required. The required signal is then generated by an inverter stroke-type block to which the AND stroke-type block is connected. Both the logical AND stroke-type block and the inverter stroke-type block are eliminated by bundling the connecting wires directly to the receiving stroke-type block.

Since it is the general rule in producing large logical machines to subdivide effort by sections of machines, bundling techniques did not early become apparent. It was desired to label each section output connecting wire with a designation of a specific logical function for the wire. Each function had its own wire. The problem of designation was solved by logical combination of signals onto the wire. A better solution is to draw connecting wires together as a bundle and label the bundle.

A concurrent object of the invention is to define logic so that bundling techniques can eliminate stroke-type blocks.

The foregoing and other objects, features and advantages of the invention will be apparent from the following more particular description of preferred embodiment of the invention, as illustrated in the accompanying drawings.

SUMMARY

Figures 1, 2, 3, 4:
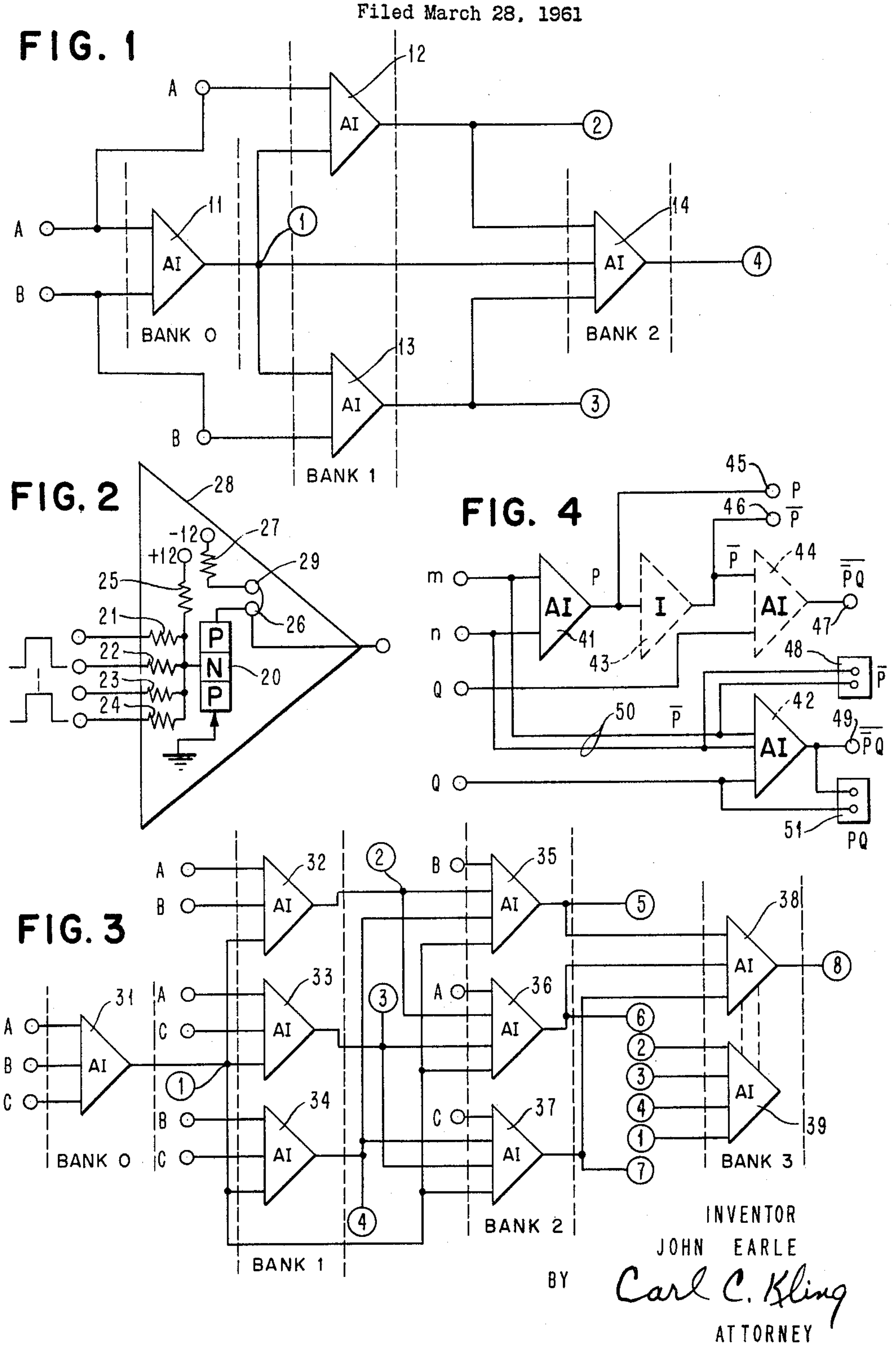
FIGURE 1 is a schematic logical diagram of the stroke-type block equivalent of a two-variable tree.
FIGURE 2 is a detail schematic diagram of a single stroke-type AND-inverter block with four inputs.
FIGURE 3 is a schematic logical diagram of the stroke-type block equivalent of three-variable tree.
FIGURE 4 is an abbreviated schematic logical diagram of a partial circuit intended to illustrate "bundling."

The inversion characteristics of the logical AND-inverter circuit (stroke-type block) necessitate a special type of diamond configuration to form the logical equivalent of the relay tree. For *n* variables there are required logical banks 0–*n* of stroke-type blocks, each bank but bank 0 and bank *n* having a plurality of stroke-type blocks.

Inputs to the bank 0 stroke-type block are each of the input variables. Inputs to bank 1 of stroke-type blocks are the output of the bank 0 stroke-type block and all possible combinations of one less than all input variables to the respective stroke-type blocks. Each stroke-type block in any bank ($x$) is provided certain inputs from each of the preceding bank outputs and all possible combinations of ($n-x$) input variables. The bank *n* stroke-type block is provided an input from each of the circuits in the preceding banks. The output of each stroke-type block in the entire configuration is one term of the standard sum of products.

*Figure 1.—Two-variable tree*

In the top illustration, stroke-type blocks 11–14 provide outputs at respective nodes (1)–(4) as follows:

(1) $\overline{AB}$
(2) $\overline{A\overline{B}}$
(3) $\overline{\overline{A}B}$
(4) $\overline{\overline{AB}}$ Combinations of outputs from two or more nodes wired as a bundle to a receiving block (not shown) indicate the following functions:

(1,4) $\overline{AB}+AB$ ($\overline{\text{Exclusive OR}}$)
(2,3) $A\overline{B}+\overline{A}B$ (Exclusive OR)

Minimization techniques can be performed to lop off unnecessary portions of the configuration.

Stroke-type blocks 11–14 each function as AND-inverters for positive inputs. Input variables A and B are applied to stroke-type block 11, producing at node (1) the function $\overline{AB}$. The output of bank 0 stroke-type block 11 is connected as input to each of the other stroke-type blocks in the circuit. Stroke-type block 12 thus has inputs A and $\overline{AB}$; the resultant signal $\overline{A\overline{B}}$ appears at node (2). Stroke-type block 13 has inputs $\overline{AB}$ and B, producing at output node (3) the signal $\overline{\overline{A}B}$. Stroke-type block 14 has the following logical inputs:

$$\overline{AB}, \overline{\overline{A}B}, \overline{A\overline{B}}$$

The output of stroke-type block 4 thus is $(\overline{AB})(\overline{\overline{A}B})(\overline{A\overline{B}})$; the output of stroke-type block 14 is thus $\overline{\overline{A}\,\overline{B}}$. The $\overline{\overline{AB}}$ signal appears at node (4).

Combinations of the signals available at output nodes, taken as bundles, provide various combinatorial functions. For example, by taking the output at node (2) as a bundle with the output at node (3), the bundle is significant as the function (A Exclusive OR B) when provided as input to a receiving stroke-type block or other logical AND circuit.

*FIGURE 2.—Stroke-type block details*

For a four input stroke-type block, a PNP transistor 20 is biased for normal conduction by a power source and resistance values. Four input resistors 21–24 in parallel form a bias voltage divider with a bias resistor 25. Voltage division holds the base of the transistor negative so long as any of the inputs is negative. The nature of the input signals is shown adjacent to the input terminals of stroke-type block 28. The negative base causes conduction by the transistor, providing a positive output at a tap 26 on the collector side of an output resistor 27. This is the AND-inverter function.

With all four inputs 21–24 positive, voltage division holds the base at a positive level, cutting off transistor 20. Cutoff of transistor 20 provides a negative output at the collector side tap 26 of the output resistor 27. The stroke-type block is shown schematically as a triangle 28.

An eight-input stroke-type block may be produced by tapping a second transistor to share load resistor 27 with the first transistor 20. The collector tap of the second transistor is connected to tap 29 of transistor 20. The second transistor has input resistors analogous to 21–24 and a bias resistor analogous to 25. The eight-input stroke-type block may be shown schematically as two adjacent vertically-aligned triangles with dotted lines indicating the common collector relationship. See FIGURE 3, infra, blocks 38 and 39, which function together as an eight input stroke-type block (seven inputs used).

*FIGURE 3.—Three-variable tree*

Stroke-type blocks 31–38 provide outputs at respective nodes (1)–(8). The transistor represented by triangle 39 is tapped common collector with the transistor of stroke-type block 38 to extend the stroke-type function to eight (7 used) inputs. The capital letters A, B, C are used to denote the variables—wherever the input terminals of any two or more stroke-type blocks are denoted by the same capital letter, it means that those blocks receive the same signal representing that particular variable. The outputs at the nodes are:

(1) $\overline{ABC}$ (4) $\overline{\bar{A}BC}$ (7) $\overline{\bar{A}\bar{B}C}$
(2) $\overline{AB\bar{C}}$ (5) $\overline{\bar{A}B\bar{C}}$ (8) $\overline{\bar{A}\bar{B}\bar{C}}$
(3) $\overline{A\bar{B}C}$ (6) $\overline{A\bar{B}\bar{C}}$ As in the two-variable tree, combinations of outputs from two or more nodes, or from an input variable and one or more nodes, when connected as a bundle to a receiving stroke-type block, indicate complex functions.

For example, the bundle (3) (4) (5) indicates the following complex function:

$$\begin{aligned}(3)(4)(5) &= \overline{(\overline{A\bar{B}C})(\overline{\bar{A}BC})(\overline{\bar{A}B\bar{C}})} \\ &= \overline{(\bar{A}+B+\bar{C})(A+\bar{B}+\bar{C})(A+\bar{B}+C)} \\ &= A\bar{B}C+\bar{A}BC+\bar{A}B\bar{C}\end{aligned}$$

In blank 0, block 31 receives inputs A, B, C and produces output $\overline{ABC}$ at node (1).

In bank 1, block 32 receives inputs A, B and ABC to produce output $\overline{AB\bar{C}}$ at node (2). Block 33 produces $\overline{A\bar{B}C}$ at node (3) in response to inputs A, C and $\overline{ABC}$. Block 34 produces $\overline{\bar{A}BC}$ at node (4) in response to inputs B, C and $\overline{ABC}$.

In bank 2, block 35 receives inputs B, $\overline{AB\bar{C}}$, $\overline{\bar{A}BC}$ and $\overline{ABC}$. Block 35 develops signal $\overline{\bar{A}B\bar{C}}$ at node (5). Block 36 develops signal $\overline{A\bar{B}\bar{C}}$ at node (6) in response to inputs A, $\overline{AB\bar{C}}$, $\overline{A\bar{B}C}$ and $\overline{ABC}$. Block 37 responds to inputs C, $\overline{\bar{A}BC}$, $\overline{A\bar{B}C}$ and $\overline{ABC}$ to produce $\overline{\bar{A}\bar{B}C}$ at node (7).

In bank 3, block 38 receives as direct inputs the positive outputs from nodes (5), (6) and (7), $\overline{\bar{A}B\bar{C}}$, $\overline{A\bar{B}\bar{C}}$ and $\overline{\bar{A}\bar{B}C}$. Its transistor is cut off only when all of the three input signals appear. Block 39 is common collector connected to block 38, and receives as inputs the outputs from nodes (2), (3), (4) and (1), $\overline{AB\bar{C}}$, $\overline{A\bar{B}C}$, $\overline{\bar{A}BC}$ and $\overline{ABC}$. Its transistor is cut off only when all of the four input signals appear. Both transistors are simultaneously cut off only when all seven node signals appear; block 38 output $\overline{\bar{A}\bar{B}\bar{C}}$, at node (8) thus is the catch-all, the complement of all other outputs taken as a group.

ALGORITHM

An algorithm is a statement of definitions for a system of logical calculation, or the system itself. The stroke type block tree functions according to the following algorithm, where $n$ is the number of input variables and $x$ is any particular bank of stroke-type block banks 0 to $n$:

(a) Each bank $x$ (except bank $n$) receives as inputs, to respective stroke-type blocks, specific sets of all possible sets of combinations of $(n-x)$ input variables;

(b) Each stroke-type block which receives a set of inputs specified above in clause (a) also receives as inputs the outputs from all previous bank stroke-type blocks which have input sets including the same input variables;

(c) Bank $n$ stroke-type block receives as inputs the outputs from each stroke-type block in each previous bank of stroke-type blocks;

(d) The number $C_x^n$ of stroke-type blocks in any given bank $x$ for an $n$-input tree is a factorial function of $n$ and $x$ as follows:

$$C_x^n=\frac{n!}{(n-x)!x!}$$

(e) And the total number of stroke-type blocks in a complete tree is as follows:

$$\underset{x=0}{\overset{x=n}{\text{Sum}}}\ \frac{n!}{(n-x)!x!}=2^n$$

The algorithm for the tree involves factorial functions of $n$ (the number of input variables) and $x$ (the number assigned to any chosen bank of banks 0–$n$ of stroke-type blocks). The factorial of a given number (X) is generally written X! and stated in words "X factorial." The X! value is a composite product of X times $(X-1Y)$ times $(X-2Y)$ times $(X-3Y)$ until the term $(X-zY)$ is equal to 0. The final term $X-zY$, for multiplying purposes, is treated as the digit 1. The term Y is generally 1. The value of X! generally is $$X(X-1)(X-2)(X-3)(X-4)\ \ldots\ (X[-z-1])(1)$$

Some common factorial values are:

$$\begin{aligned}6! &= 720 = 6\cdot5\cdot4\cdot3\cdot2\cdot1 \\ 5! &= 120 = 5\cdot4\cdot3\cdot2\cdot1 \\ 4! &= 24 = 4\cdot3\cdot2\cdot1 \\ 3! &= 6 = 3\cdot2\cdot1 \\ 2! &= 2 = 2\cdot1 \\ 1! &= 1 = 1 \\ 0! &= 1\ \text{(Arbitrary)}\end{aligned}$$

The circuit illustrated in FIGURE 1 is a two-variable tree, where $n=2$. It fulfills the algorithm as follows:

Bank 0 $x=0$

Bank 0 receives as inputs all possible sets of combinations of $(n-x)$ input variables. Since $(n-x)=(2-0)=2$, and there is only one combination, A and B, of the two input variables A and B, clause (a) is fulfilled.

Bank 0 receives as inputs the outputs of all previous bank stroke-type blocks which have input sets including the same input variables, as specified by clause (b). There are no previous banks, hence no inputs other than variables A and B.

Bank 0 contains one stroke-type block, block 11. The number $$C_x^n=C_0^2=\frac{2!}{(2)!1!}=\frac{2}{(2)1}=1$$

Clause (d) is thus fulfilled.

Bank 1 $x=1$

Stroke-type block 12 receives as input set A of all possible sets of combinations of $(n-x)$ input variables. Stroke-type block 13 receives as input set B. Since $n=2$ and $x=1$, $(n-x)=1$; there are possible only two sets, (A) and (B), of one input variable for two inputs A and B. Clause (a) is fulfilled.

Block 12 also receives as input the output of block 11, which includes as input the variable A. Block 13 also receives as input the output of block 11, which includes as input the variable B. Clause (b) is thus fulfilled.

The number $C_x^n$ of stroke-type blocks is as follows:

$$C_x^n=C_1^2=\frac{2!}{(2-1)!1!}\ \frac{2}{(1)1}=2$$

Clause (d) is thus fulfilled.

Bank 2 (Bank $n$) $x=2$

Bank 2 stroke-type block 14 receives as inputs the outputs from each stroke-type block in each previous bank of stroke-type blocks, i.e., the outputs of blocks 11, 12 and 13. Clause (c) is thus fulfilled.

The number $C_x^n$ of stroke-type blocks in bank 2 is:

$$C^n_x=C_2^2=\frac{2!}{(2-2)!2!}\ \frac{2}{(1)2}=1$$

Clause (d) is thus fulfilled.

TOTAL NUMBER OF STROKE-TYPE BLOCKS $$\underset{x=0}{\overset{x=2}{\text{Sum}}}\ (\underset{x=1}{1}\ +\ \underset{x=2}{2}\ +\ \underset{x=n}{1})\ =2^2=4$$

Clause (e) is thus fulfilled.

The circuit illustrated in FIGURE 3 fulfills the algorithm in all particulars. A spot check on block 36 indicates that block 36 fulfills clauses (a) and (b) as follows:

Block 36 is in bank 2, where inputs from variables are A to block 36, B to block 35 and C to block 37. Since $n$ is 3, and this is bank 2, $(n-x)=(3-2)=1$.

Block 36 also receives as inputs the outputs of blocks 31, 32 and 33. Blocks 31, 32 and 33 each include as one of their inputs the variable A. Note that block 34 does not have the A input.

Bank 2 contains three stroke-type blocks.

$$C_x^n = C_2^3 = \frac{3!}{(3-2)!2!} = \frac{6}{(1)2} = 3$$

The total number of stroke blocks is eight.

$$\operatorname*{Sum}_{x=0}^{x=3} \;\underset{\text{Bank 0}}{(1} + \underset{\text{Bank 1}}{3} + \underset{\text{Bank 2}}{3} + \underset{\text{Bank 3}}{1)} = 2^3 = 8$$

In a six-variable tree, for example, the stroke-type block count ($2^n$) is 64 ($2^6$). Bank 0 is a six-input stroke-type block and bank 6 is a 63-input stroke-type block. The number of stroke-type blocks in the various banks are:

1 6 15 20 15 6 1

Actual component counts will be greater whenever the fan-in inputs are limited. For example, a six-input stroke-type block may take two transistors; a 63-input stroke block may require up to thirty transistors.

The bank $n$ stroke-type block always has a relatively great number of inputs, and therefore is costly. Wherever possible, it is to be eliminated along with its functions.

*FIGURE 4.—"Bundling"*

The figure shows first, second, third and fourth stroke-type blocks 41–44 and output taps 45–49 in a composite of prior art and bundling circuit connections. Connecting wire bundle 50 and bundle terminal 51 also appear. Inputs $m$, $n$ and Q are available. Inputs $m$ and $n$ to (AND INVERTER) stroke-type block 41 result in signal P at the output of stroke-type block 41 and at tap 45. Since the term $\overline{P}$ is required as input to receiving stroke-type block 44, inverter stroke-type block 43 is added to produce $\overline{P}$, which is then available at tap 45. With the Q input connected, AND INVERTER stroke-type block 44 output at tap 47 is $\overline{\overline{P}Q}$, or $\overline{(P+\overline{Q})}$.

The third stroke-type block 43 is eliminated by bundling techniques. The second stroke-type block 42 replaces both the third and fourth blocks. Inputs $m$ and $n$ form bundle 50 with significance $\overline{P}$. Bundle terminal 48 makes $\overline{P}$ available at twin taps. With the $\overline{P}$ bundle and Q connected as inputs, receiving block 42 produces output signal $\overline{\overline{P}Q}$, or $\overline{(P+\overline{Q})}$ at terminal 49. The term PG is available at bundle terminal 51. Since the AND relationship prevails on the bundle, $(P+\overline{Q})Q=PQ$. The connecting wires in a bundle remain mutually insulated at all times; their relationship is logical only.

Where the signal P is not needed, even stroke block 41 can be eliminated.

EXAMPLE OF BUNDLING TREE OUTPUTS

The tree outputs bundle similarly. Output nodes (1) and (4) of the two-variable tree in FIGURE 1 are significant as $(\overline{AB})(\overline{\overline{A}\overline{B}})$ when bundled to a receiving stroke-type block. By connecting FIGURE 1 nodes (1) and (4) to input resistances 21 and 24 in FIGURE 2, transistor 20 becomes subject to coincidence of signals $(\overline{AB})$ and $(\overline{\overline{A}\overline{B}})$. Stroke-type block 28 functions as an AND inverter for the positive signals $\overline{AB}$ and $\overline{\overline{A}\overline{B}}$, producing a negative output during coincidence. Coincidence of $\overline{AB}$ and $\overline{\overline{A}\overline{B}}$ occurs in signals $A\overline{B}$ and $\overline{A}B$, or $A \forall B$.

Additional inputs to stroke-type block 28 might be an instruction control input such as encode E and a timing input T. Output of block 28 inputs E, T and bundle AB is $\overline{ET(A \forall B)}$.

The limit to the size of the bundle is the fan-in limitation of the receiving logical block.

*Résumé.—FIGURE 3*

This invention is a circuit made up of stroke-type blocks (the family of AND-inverters and OR-inverters) which is the functional equivalent of the relay tree.

For $n(3)$ variables there are required logical banks 0, 1 . . . $n(3)$ of stroke-type blocks 31–39—banks 0 and 3 contain one stroke-type block while banks 1 and 2 contain three stroke-type blocks each.

Inputs to the bank 0 stroke-type block 31 are each of the input variables A, B and C. Inputs to respective bank 1 stroke-type blocks 32, 33 and 34 are the output of bank 0 stroke-type block 31 and all possible combinations of $(n-1)$ input variables, AB, AC and BC. Inputs to the respective bank 2 stroke-type blocks 35, 36 and 37 are $(n-2)$ combinations A, B and C, and for each block 35, 36 and 37, the outputs of all previous blocks having the same input variable. Block 35, for example, has input variable B. Its other inputs are from those previous blocks which have a B input, blocks 31, 32 and 34. The bank $n$ stroke-type block 38 (extended for additional output by block 39) has as inputs the outputs of all previous blocks.

The output of each stroke-type block 31–38, available at respective nodes (1)–(8), is the respective term of the following standard sum of products:

| | | |
|---|---|---|
| (1) $\overline{ABC}$ | (4) $\overline{\overline{A}BC}$ | (7) $\overline{\overline{A}\overline{B}C}$ |
| (2) $\overline{AB\overline{C}}$ | (5) $\overline{\overline{A}B\overline{C}}$ | (8) $\overline{\overline{A}\overline{B}\overline{C}}$ |
| (3) $\overline{A\overline{B}C}$ | (6) $\overline{A\overline{B}\overline{C}}$ | |

While the invention has been particularly shown and described with reference to preferred embodiments thereof, it will be understood by those skilled in the art that the foregoing and other changes in form and details may be made therein without departing from the spirit and scope of the invention.

What is claimed is:

1. A stroke-type function tree for $n$ input variables comprising $n+1$ banks of similar stroke-type blocks sequentially ranked 0–$n$, with interconnections according to the following algorithm:

(a) Each bank $x$ (except bank $n$) receives as inputs, to respective stroke-type blocks, specific sets of all possible sets of combinations of $(n-x)$ input variables;

(b) each stroke-type block which receives a set of inputs specified above in clause (a) also receives as inputs the outputs from all previous bank stroke-type blocks which have input sets including the same input variables;

(c) bank $n$ stroke-type blocks receives as inputs the outputs from each stroke-type block of each previous bank of stroke-type blocks;

(d) the number $C_x^n$ of stroke-type blocks in any given bank $x$ for an $n$-input tree is a factorial function of $n$ and $x$ as follows:

$$C_x^n = \frac{n!}{(n-x)!x!}$$

(e) and the total number of stroke-type blocks in a complete tree is as follows:

$$\operatorname*{Sum}_{x=0}^{x=n} \frac{n!}{(n-x)!x!} = 2^n$$

2. A stroke-type function tree according to claim 1 wherein each of said stroke-type blocks is a NAND block.

3. A stroke-type function tree according to claim 1 wherein each of said stroke-type blocks is a NOR block.

References Cited by the Examiner

UNITED STATES PATENTS

| | | | |
|---|---|---|---|
| 2,953,773 | 9/1960 | Nicolantonio | 307—88.5 |
| 3,027,465 | 3/1962 | Di Lorenzo | 307—88.5 |
| 3,028,088 | 4/1962 | Dunham | 307—88.5 |
| 3,074,640 | 1/1963 | Maley | 307—88.5 X |
| 3,075,093 | 1/1963 | Boyle | 307—88.5 |
| 3,094,614 | 6/1963 | Boyle | 307—88.5 X |

OTHER REFERENCES

Hurley, Transistor Logic Circuits, Wiley and Sons, 1961, pp. 31 to 32, 128.

Kellett, The Elliott Sheffer Stroke Switching System, Electronic Engineering, September 1960, pp. 534–539.

ARTHUR GAUSS, *Primary Examiner.*

HERMAN K. SAALBACH, *Examiner.*